United States Patent [19]
Osterberg et al.

[11] 3,774,164
[45] Nov. 20, 1973

[54] DATA TERMINAL SYSTEM

[75] Inventors: Bruce H. Osterberg, Manhattan Beach; William W. Caldwell, Palos Verdes Estates; Walter J. Orzechowski, Arleta; Herbert D. Pace, Woodland Hills; Arthur J. Murphy, Northridge, all of Calif.

[73] Assignee: Western Data Products, Inc., Los Angeles, Calif.

[22] Filed: May 22, 1972

[21] Appl. No.: 255,469

Related U.S. Application Data

[63] Continuation of Ser. No. 40,929, May 27, 1970.

[52] U.S. Cl. .......... 340/172.5
[51] Int. Cl. .......... G06f 3/02
[58] Field of Search .......... 340/172.5, 365 R, 340/365 S; 346/34, 74 M

[56] References Cited

UNITED STATES PATENTS

| | | | |
|---|---|---|---|
| 3,380,031 | 4/1968 | Clayton et al. | 340/172.5 |
| 3,631,403 | 12/1971 | Einar Asbo et al. | 340/172.5 |
| 2,940,669 | 6/1960 | Hobbs | 340/365 S |
| 3,289,210 | 11/1966 | Davis et al. | 346/74 M |
| 3,535,560 | 10/1970 | Cliff | 340/172.5 |
| 3,381,276 | 4/1968 | James | 340/172.5 |
| 3,419,883 | 12/1968 | Chapsky | 346/34 |

*Primary Examiner*—Harvey E. Springborn
*Attorney*—Fulwider, Patton, Rieber, Lee & Utecht

[57] ABSTRACT

Apparatus and method for generating and assembling data in a particular format in a remote data terminal and, thereafter, transmitting the data to a central computer. Data is assembled in fields of predetermined length on a plurality of multiple position switches with integral visual readouts for visually verifying the data before storage in a local memory in the terminal. The data is stored in response to manual initiation of a storage control sequence. When the data is assembled in the predetermined format, the terminal is connected to the computer over a telephone line through manually initiated automatic dialing, or manual dialing, and, when the computer indicates that it is ready to receive data by means of an audible signal, the data is transmitted to the computer by manual initiation of an output control sequence.

16 Claims, 5 Drawing Figures

INVENTORS
BRUCE H. OSTERBERG
WILLIAM W. CALDWELL
WALTER J. ORZENCHOWSKI
HERBERT D. PACE
ARTHUR J. MURPHY
By Fulwider Patton Rieber Lee & Utecht
ATTORNEYS

| FIELD | CONTENTS | SOURCE |
|---|---|---|
| 1 | * (FIELD SEPARATOR)<br>UP TO 12 NUMERIC CHARACTERS<br>* | LOGIC<br>GENERAL INPUT SWITCHES<br>LOGIC |
| 2 | FIELD I.D. NUMBER<br>6 ALPHABETIC CHARACTERS (12 TOTAL CHARACTERS) | FIELD I.D. SWITCH<br>GENERAL INPUT SWITCHES |
| 3 | FIELD I.D. NUMBER<br>12 NUMERIC CHARACTERS<br>* | FIELD I.D. SWITCH<br>GENERAL INPUT SWITCHES<br>LOGIC |
| 4 | 2 NUMERIC CHARACTERS (FORMAT CODE)<br>FIELD I.D. NUMBER<br>12 NUMERIC CHARACTERS | FORMAT CODE SWITCHES<br>FIELD I.D. SWITCH<br>GENERAL INPUT SWITCHES |
| 5 | FIELD I.D. NUMBER<br>12 NUMERIC CHARACTERS | FIELD I.D. SWITCH<br>GENERAL INPUT SWITCHES |
| 6 | FIELD I.D. NUMBER<br>12 NUMERIC CHARACTERS<br>* | FIELD I.D. SWITCH<br>GENERAL INPUT SWITCHES<br>LOGIC |
| 7 | 2 NUMERIC CHARACTERS (PROCEDURE CATALOG)<br>FIELD I.D. NUMBER<br>12 NUMERIC CHARACTERS | CATALOG SWITCHES<br>FIELD I.D. SWITCHES<br>GENERAL INPUT SWITCHES |
| 8 | FIELD I.D. NUMBER<br>12 NUMERIC CHARACTERS | FIELD I.D. SWITCH<br>GENERAL INPUT SWITCHES |
| 9 | FIELD I.D. NUMBER<br>12 NUMERIC CHARACTERS | FIELD I.D. SWITCH<br>GENERAL INPUT SWITCHES |
| 1ϕ | ANY ALPHANUMERIC CHARACTER OR *<br>TO # (END OF STORAGE) | KEYBOARD<br>LOGIC |

Fig.3

INVENTORS
BRUCE H. OSTERBERG
WILLIAM W. CALDWELL
WALTER J. ORZENCHOWSKI
HERBERT D. PACE
ARTHUR J. MURPHY
By Fulwider, Patton, Rieber, Lee, & Utecht
ATTORNEYS INVENTORS
BRUCE H. OSTERBERG
WILLIAM W. CALDWELL
WALTER J. ORZENCHOWSKI
HERBERT D. PACE
ARTHUR J. MURPHY
By Zuluider, Patton, Rieber, Lee & Utecht
ATTORNEYS INVENTORS
BRUCE H. OSTERBERG
WILLIAM W. CALDWELL
WALTER J. ORZENCHOWSKI
HERBERT D. PACE
ARTHUR J. MURPHY
By Zulwider, Patton, Rieber, Lee & Utecht
ATTORNEYS

DATA TERMINAL SYSTEM

This is a continuation of application Ser. No. 40,929, filed May 27, 1970.

BACKGROUND OF THE INVENTION

1. Field of the Invention

The present invention relates generally to data terminal systems and, more particularly, to such a system for assembling data in a terminal for transmission to a computer, with the terminal being operated by combined manual and automatic control.

2. Description of the Prior Art

In the data processing field, the development of time sharing computer systems has made computers available for use by large numbers of individuals and organizations. Typically, a relatively inexpensive data terminal is installed at a time-share subscriber's remote location, and the data terminal is linked to the computer through conventional telephone lines. The data terminal may be initially connected to the computer, alternatively by automatically or manually dialing the telephone number of the computer.

There have been recent developments in time sharing computer techniques for only gathering information from a plurality of remote locations for storing and processing in a central computer. These time sharing techniques are particularly applicable to governmental or private programs in which a number of individuals or organizations must regularly submit numerous detailed and standardized reports of services performed under the program to a central agency or office.

For example, in order to receive compensation for medical treatment of patients under a public health program, individual physicians and clinics must submit detailed reports of the treatment for each patient to a central administrative agency. Ordinarily, such reports require a considerable amount of clerical time to prepare, and the data in the reports is eventually stored and processed in a computer. It can be appreciated that considerable clerical time can be saved in both the physician's and the agency's office by transmitting the data directly to the computer by means of data terminals in the physician's offices connected to a computer time sharing system through conventional telephone lines.

While conventional data terminals can be used for only transmitting data from a physician's office to a central computer, such terminals are normally designed for more versatile applications and have general data reproducing output devices, such as a print mechanism. Since the main requirement of the terminal in the physician's office is the transmission of data in a particular format to the central computer, the versatility of a conventional data terminal is not needed. Additionally, such a terminal tends to be relatively expensive and difficult to use in a physician's office by clerical personnel who are often not specially trained to use such devices.

Thus, there has long been a need in the data processing field for a relatively simple, efficient and reliable data terminal system which would be economical and easy to use in the gathering of data in a particular standardized format from a number of remote locations for storage and processing in a central computer. The present invention satisfies that need.

SUMMARY OF THE INVENTION

The data terminal system of the present invention provides an economical and efficient apparatus and method for generating and assembling data in a particular report format at a remote location and, thereafter, transmitting the data to a central computer. The operation of the terminal is under combined manual and automatic control in which automatically controlled operations are economically and efficiently manually initiated at the proper times by the terminal operator. Additionally, data is entered into the terminal in data fields of predetermined length on a series of manually operable input devices with integral visual readouts, whereby each field of data is displayed for verification prior to entry into the terminal. The need for a relatively expensive data receiving and reproducing device, such as a printing mechanism, to receive coded data from the computer, or to verify data entered into the terminal, is thereby eliminated, greatly reducing the cost of the terminal.

A field description means in the form of a roller having longitudinally arranged field descriptions is used to facilitate the setting of numerically coded data on the input devices and field identification data is entered into the terminal by means of another input device operatively associated with the field description means. The number of input devices which must be set for each data field is thereby reduced.

The operating time for the automatically controlled data processing operations in the terminal is relatively short because data entry into the terminal, and data transfer to the computer, are made at relatively high speed compared to the time required to set up and verify an entire field of data on the manually operated input devices, and the time required for connecting the terminal to the computer. This fact is used to great advantage in the data terminal system of the present invention by providing the terminal with a controlled power supply which continuously supplies power only to the memory of the terminal and selectively supplies power to the remaining data processing circuitry in the terminal when needed.

A preferred format for the report contains primarily numerical data, and one feature of a presently preferred embodiment of the data terminal of the invention is the use of the tone-code, used in telephone systems for "touch-tone," push button dialing, as the transmission code for the terminal. One of the fields of data may, therefore, conveniently contain the telephone number of the computer and the transmission of the one field can then automatically dial the computer if the telephone system in use has the "touch-tone" dialing capability. Alternatively, the stored telephone number may be used to control a pulse-type automatic dialer if the telephone system does not have the "touch-tone" dialing capability.

There are only sixteen available characters in the tone-code which is principally used to transmit numeric characters. While the preferred report format of the present invention contains primarily numerical data, it is desirable to utilize alphabetic characters in particular portions of the report. Therefore, an additional feature of the preferred embodiment of the terminal of the invention is the ability to store and transmit the twenty-six alphabetic characters by representing each alphabetic character by a combination of one of the ten numeric characters and one of the six remaining charaters of the tone-code which have no assigned numerical significance. The entire range of alphanumeric characters may be stored and transmitted by the terminal even though the transmission code used has an insufficient number of available characters.

A further feature of the preferred embodiment of the terminal of the present invention is that often repeated data messages, for particular fields of data, are entered into the memory of the terminal by means of a visual catalog of messages, one of which may be selected by a manually operated indicator connected to an input device which generates a corresponding numeric code. Thus, the numerically coded data for certain fields may be directly entered into the terminal to substantially decrease the time required to assemble a complete report.

Another feature of the preferred embodiment of the invention is the separation of the fields of data into groups according to their variability from report to report. Invariable data for more than one report may then be entered into the terminal only once and only the variable data changed for different reports. The time needed to assemble a complete report is then further reduced.

A further feature of the preferred embodiment of the present invention is the use of a plurality of single-pole multiple-position switches as the input devices. Corresponding switch positions of each switch are all connected together to a common line into a code converting section of the terminal. The common input line for each switch position significantly reduces the logical control devices needed in the terminal. Each switch is enabled through the pole terminal in accordance with a predetermined input control sequence dependent on the field of data to be entered into the memory of the terminal.

Thus, the data terminal system of the present invention provides for the economical and efficient assembly and storage of data in a predetermined report format for transmission to a central computer by manually initiating the storage of the data fields, the connection to the computer, and the transmission of the assembled data to the computer. The actual storage of the data in the terminal and the transmission of the data to the computer is efficiently automatically controlled by data processing circuitry which is enabled only when needed. Additionally, the time required for setting up of numerically coded data is greatly reduced by utilizing numerical input devices operatively connected to cataloged visual messages to advantageously eliminate numerical encoding for portions of a complete report. The time required to change data in the terminal is reduced by assigning degrees of variability to various fields of data so that invariable data need not be changed from report to report.

Other features and advantages of the data terminal system of the present invention will become apparent from the following drawings and specification.

DESCRIPTION OF THE DRAWINGS

FIG. 3 is a tabulation of the data fields, their contents, and the source of the data for the particular illustrative storage format of the data terminal of the present invention;

DESCRIPTION OF THE PREFERRED EMBODIMENT

Figure 1:
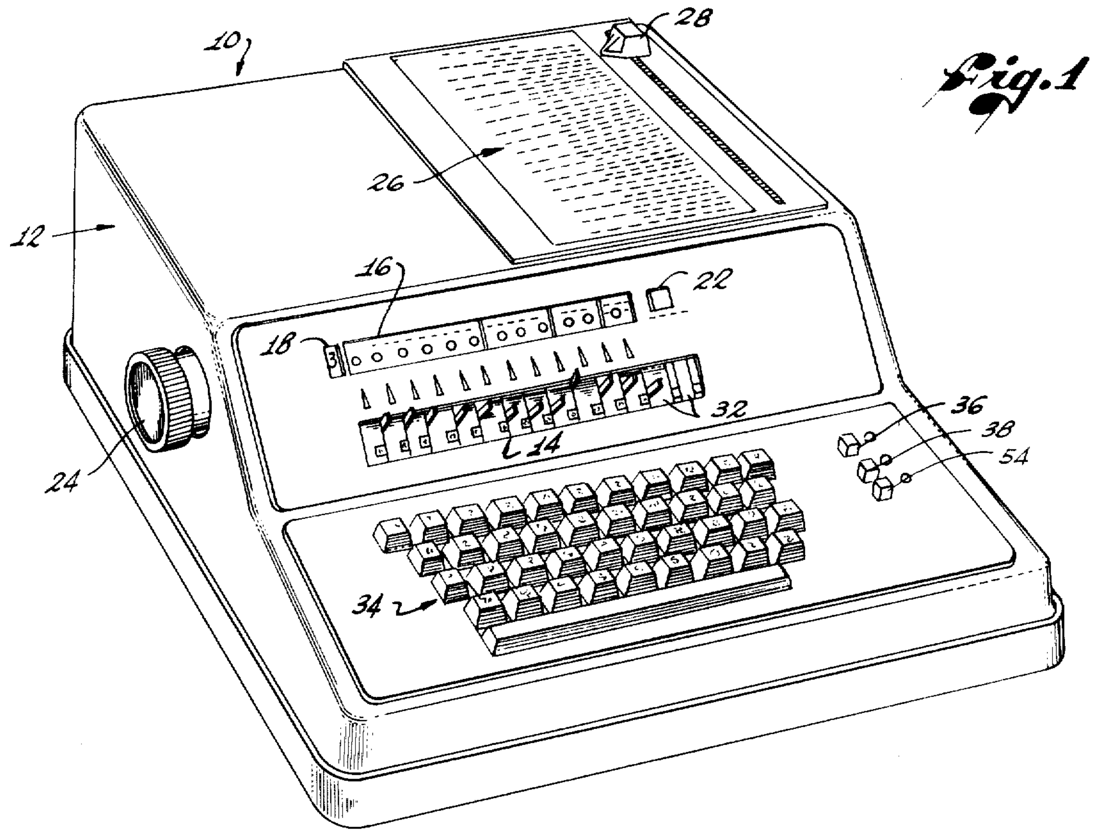
FIG. 1 is a perspective view illustrating the external appearance of a data terminal embodying the present invention, showing the various input devices for entering data into the terminal.

Turning now to the drawings, and particularly to FIG. 1 thereof, a remote data terminal 10 incorporating the system of the present invention is housed in a case 12 suitable for operation on a desk top or similar location. The actual physical appearance of the terminal and the number and type of input devices needed naturally depends on the intended application of the terminal.

The terminal 10 shown in FIG. 1 is intended for use in assembling a coded medical report, in a predetermined format, of a patient's visit to a physician and the various input devices needed for this purpose are arranged on the case for convenience and ease of operation. Accordingly, the case 12 has a series of twelve horizontally aligned, general input switches 14 which serve as the main means for entering data into the terminal 10.

The general input switches 14 are preferably ten-position lever switches having integral visual numerical readouts so that the number set on each switch can be visually checked. It should be appreciated, however, that the number and type of the general input switches 14 can vary widely depending on the application for which the data terminal 10 of the present invention is adapted.

The general input switches 14 are aligned below a horizontal window 16 in which is visually displayed a character-by-character description of a field of data which is to be entered on the switches. Ten fields of data are provided and each field is identified by a field identification number which is displayed in a small side window 18.

The field identification number and field descriptions are conveniently longitudinally arranged on a horizontal roller (not shown) mounted within the case 12, and the roller is operatively connected to another ten-position field identification switch 20 (shown in FIGS. 4 and 5), each switch position corresponding to a particular field identification number displayed in the side window 18. For convenience, the field description roller is physically advanced in response to depression of a "store" pushbutton 22, as each field of data is entered into the terminal, but the roller may be manually positioned to any field by means of a manual field control knob 24 extending outwardly through the case 12.

In the medical report application for which the illustrative embodiment of the data terminal 10 is intended, it is anticipated that certain common medical procedures will be performed on a number of different patients. Therefore, for convenience and speed of data entry into the terminal 10, a visual catalog 26 of commonly employed medical procedures is provided in tabular form on the case 12 and an indicating knob 28 is movable into alignment with any of the listed medical procedures. In the presently preferred embodiment of the invention, the indicating knob is operatively connected to a pair of ten-position switches 30 (shown in FIGS. 4 and 5) so that particular switch position combinations are formed for each listed medical procedure.

Data stored in the terminal 10 is not retained when the terminal is turned off so that the complete data for a report must be entered into the terminal when it is first turned on to transmit a report or a series of reports to the computer. For convenience and increased speed of operation, data which is repetitive for all reports, such as the data used to identify the terminal 10 to the computer, is entered into the terminal only once, in an "initialization" procedure, when the terminal is turned on. Thereafter, as long as the terminal 10 stays on, this data is retained and need not be reentered as the data for each patient report is entered into the terminal.

In the illustrated, presently preferred embodiment of the terminal 10, the first three fields are reserved for this purpose and, by a mechanical interlock (not shown), the roller is normally positioned to display these fields only during the initialization procedure. To further facilitate entry of the repetitive data, a pair of format code switches 32 (FIGS. 4 and 5) are provided which may be preset to a two digit number indicating, for example, the particular type of report format used in the terminal 10.

As was briefly mentioned above, the transmission code for the terminal system of the present invention is the tone-code used for the automatic "touch-tone" dialing of telephones. Each character of the tone-code is represented by two audio frequency signals out of eight possible signals. Thus, there are sixteen possible characters in the tone-code which is quite adequate for its intended purpose of representing the ten numeric digits.

Because of the limited number of characters in the tone-code, it is preferable that the format of the data be such that only numeric data is entered into the terminal 10 through the general input switches 14 for each field description. However, an alphanumeric keyboard 34 is provided for versatility and, for one residual data field, general alphanumeric data may be entered into the terminal in a two-character code. p In the two-character alphabetic code of the terminal 10 of the present invention, each alphabetic character is represented by the combination of one of the six available characters of the tone-code which do not have an assigned numeric significance and one of the numeric characters. The characters which are combined with the numeric characters are designated as alphabetic identification characters (abbreviated alphabetic I. D. in the drawings) and, in practice, only three such characters are needed to represent the entire alphabet and selected punctuation symbols. The two-character code and its entry into the terminal 10 is described in more detail below.

Figure 4:
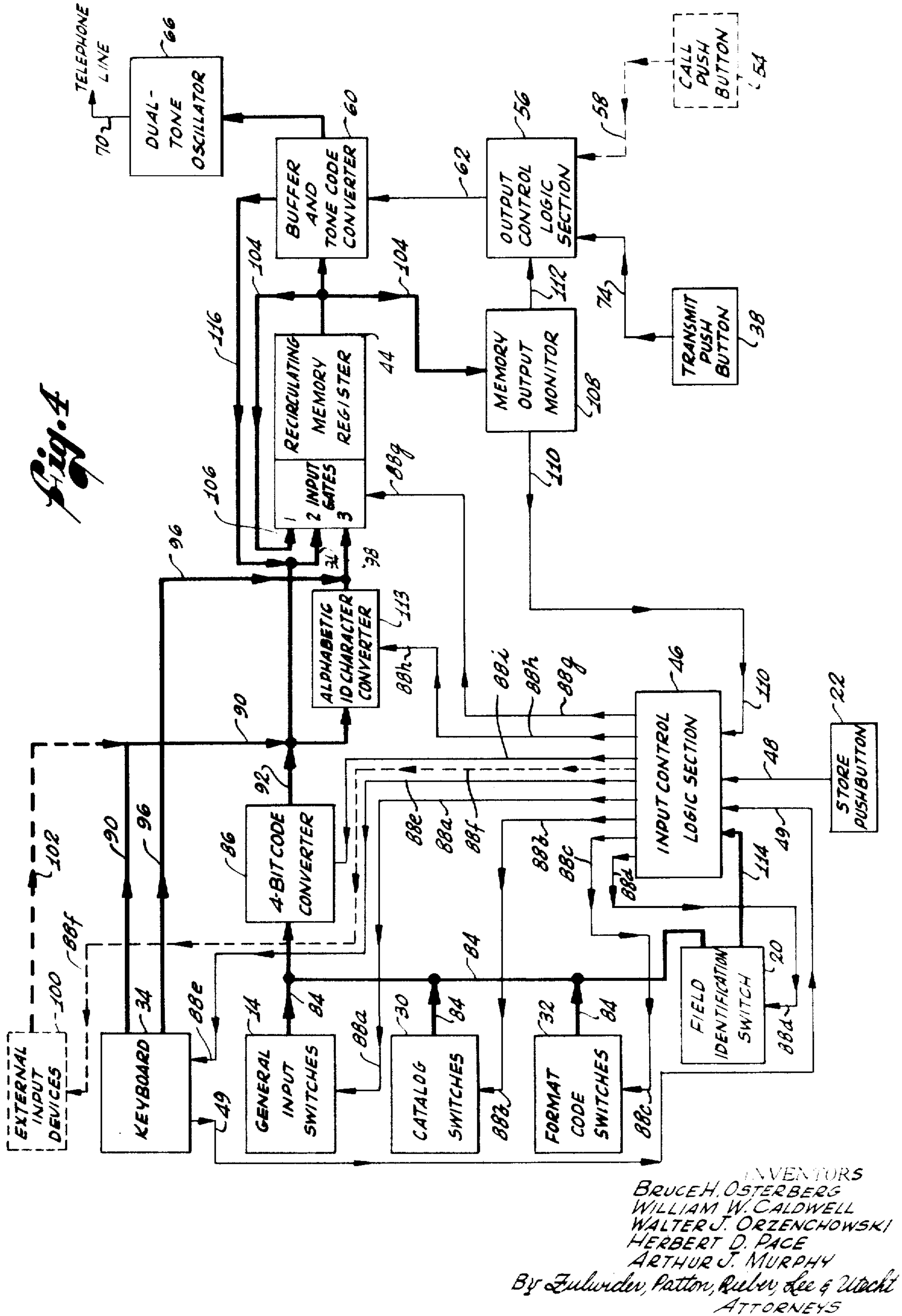
FIG. 4 is a more detailed functional block diagram of the data assembly, storage and transmission system of the present invention shown without the controlled power supply for clarity.

Depending on the format of the report to be assembled, the data for each field is entered into the terminal 10 by means of the general input switches 14, the catalog switches 30, the format code switches 32, or the keyboard 34 (see FIG. 4). The selection of any of these input devices for each field is by means of preset logic gates controlled by the position of the field identification switch 20, as will be more fully discussed below. In order to enter the data from any of the input devices except the keyboard 34 into the terminal 10, the store pushbutton 22 is depressed to initiate an automatic, internally controlled storage sequence which sequentially stores the numerical data on the proper switches 14, 30 or 32 within the terminal, depending on the data field. In the presently preferred embodiment of the invention the sotre pushbutton 22 also actuates a conventional mechanical linkage (now shown) which moves the field description roller to the next field. When a key on the keyboard 34 is depressed, the storage sequence is initiated independently of the store pushbutton 22.

When all of the fields of data have been set on the switches 14, 30 or 32, or the keyboard 34, and sequentially assembled and stored within the terminal 10, the terminal is ready to be connected to the computer so that the stored data may be transmitted to the computer for processing. It is preferable that the data terminal 10 of the present invention communicate with a computer via conventional voice-grade telephone lines in the tone-code transmission code, as discussed above. Since the terminal 10 transmits signals in the tone-code, the first field of data may contain the telephone number of the computer. The pressing of a "dial" pushbutton 36 then initiates the transmission over the telephone line of the proper audio signals for dialing the computer. However, if the telephone system in the area in which the terminal is being operated does not contain the "touch-tone" dialing capabilities, the telephone number of the computer must be manually dialed on a conventional telephone and the first data field is not used. However, the terminal may optionally be equipped with pulse dialing circuitry which automatically dials in non-touch for areas.

Whether the connection to the computer is made automatically or manually, when the computer is on the line a voice message is transmitted from the computer to the terminal 10 and preferably reproduced on an audio reproducer 37 (FIG. 2) having a conventional speaker (not shown) in the terminal. When it is established that the computer is ready to receive data, a "transmit" pushbutton 38 is depressed to initiate the sequential transmission of the assembled data in the terminal 10 to the computer at speeds compatible with the transmission rate capability of the telephone line. Thus, the complete report for a particular patient may be transmitted to the computer at relatively high speeds even though the assembly and storage of the data within the terminal 10 may have consumed considerably more time. Therefore, the operation of the terminal 10 is economical in that a minimum of computer time, and telephone time, is needed to transmit the complete report.

Figure 2:
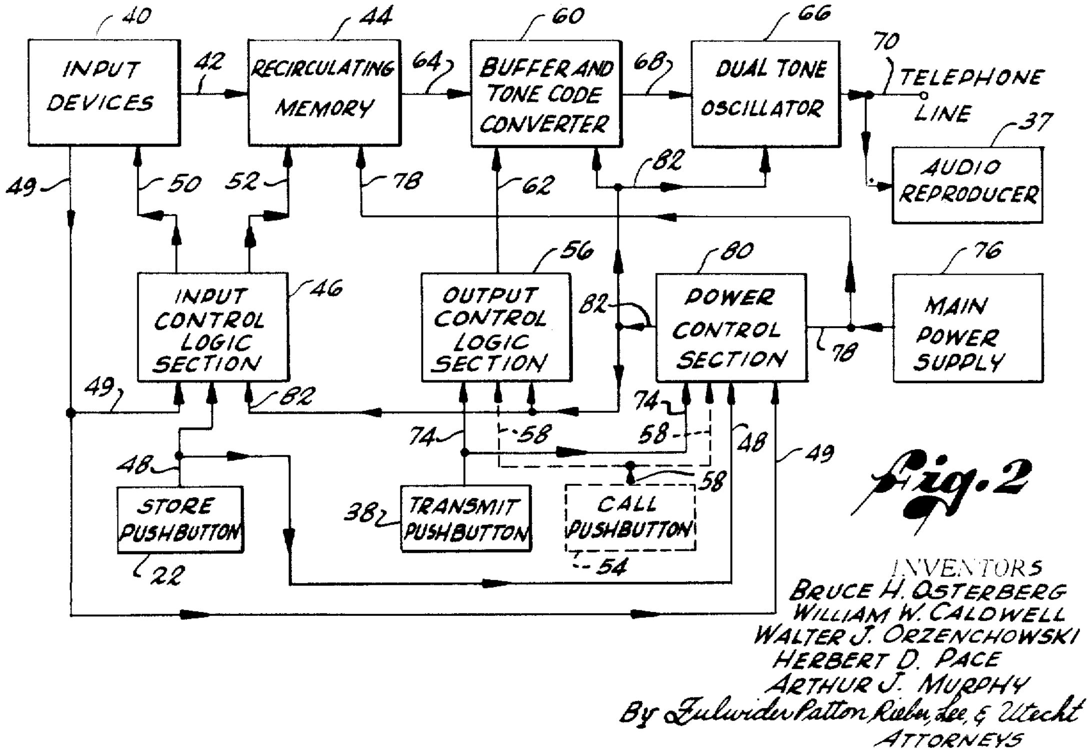
FIG. 2 is a general block diagram of the data terminal showing the controlled power supply.

FIG. 2 is a general, overall block diagram of the data terminal system of the present invention. Basiccally, the data is entered into the terminal 10 by means of a plurality of input devices 40 which include the general input switches 14, the catalog switches 30, the format code switches 32, the field identification switch 20, and the keyboard 34 (see FIG. 4) as discussed above. The data is sequentially entered through a line 42, and stored in a recirculating-type memory register 44 under the control of an input control logic section 46 which is manually activated by the store pushbutton 22 through a line 48. Since the keyboard 34 preferably operates by momentary depression of the keys, the keyboard activates the input control logic section 46 by a line 49 independently of the store pushbutton 22. The input control logic section 46 contains conventional logic implementation for the proper sequential enabling of the various switches 14, 30, 32 and keyboard 34, over a line 50 and the memory register 44 over another line 52, depending on the particular field of data.

When the data for the complete report is stored in the recirculating memory register 44, and if the telephone has the "touch-tone" dialing capability, a "call" pushbutton 54 is depressed which initiates the operation of an output control logic section 56 through a line 58. The output control logic section 56 controls a buffer and tone-code converter 60 through another line 62. The converter 60 sequentially takes the stored telephone number from its first field position in the memory register 44 through a line 64 and converts it to the proper tone-code for actuating a dual-tone oscillator 66 through another line 68. The oscillator 66 generates the proper dual audio signals for transmission over a telephone line 70 to dial the computer. The output control logic section 56 and the buffer and tone-code converter 60 are implemented by conventional logic techniques well known in the art.

As discussed above, when the computer is on the telephone line 70 and is ready to receive data, a suitable audible signal is transmitted over the telephone line 70 and received by the audio reproducer 37 which tells the operator of the data terminal 10 to transmit the data to the computer. The data is transmitted to the computer by depressing the transmit pushbutton 38 to activate the output control logic section 56 through a line 74. The output control logic section 56 controls the buffer and tone-code converter 60 to sequentially take the remaining data from the memory register 44, make the proper code conversions, and actuate the dual-tone oscillator 66 to generate the proper dual audio signals for each character. It will be appreciated that, once the computer is on the line 70, the characters transmitted in the tone-code have no further effect on the dialing apparatus of the telephone system and the tone-code may then be used as the transmission code to transmit primarily numerical data in an economical manner.

Because the storing of data from the input devices 40 in the memory register 44 consumes only a fraction of a second of operating time, the power to all sections of the terminal 10 is turned on only when a storage operation is to be performed. The memory registery 44 is in operation at all times so the power to the register is continuously applied. Accordingly, a main power supply 76 supplies power to the memory register 44 directly over a line 78 and the power is also applied to a power control section 80 which controls the power applied over another line 82 to the remaining sections of the terminal 10. The power control section 80 is activated by means of the store, transmit and call pushbuttons 22, 38 and 54, through the lines 48, 74 and 58, respectively. Since the keyboard 34 operates independently of the store pushbutton 22, the depression of a key on the keyboard not only activates the input control logic section 46 through the line 49, but also activates the power control section 80 independently of the store pushbutton through the same line 49.

The particular data assembly and storage format for the presently preferred embodiment of the data terminal 10 of the invention is illustrated in FIG. 3. Basically, ten fields of data are provided in which the first three fields (1-3) are designated as containing "fixed" data which is set on the general input switches 14 (FIG. 4) and stored in the memory register 44 of the terminal 10 only once when the terminal is turned on and initialized, as discussed above. The remaining seven fields contain data which may be changed for each report to be transmitted to the computer.

However, it is anticipated that, in particular instances, some fields of the remaining data will not be changed for at least two transmitted reports. For example, if more than one member of a particular family were to visit a physician at the same time, some of the data identifying the family and their account number would remain the same while the details concerning each patient would be different. To conveniently handle this type of situation, three of the remaining fields of data are designated as "semi-variable" data and occupy fields 4, 5 and 6, while fields 7, 8 and 9 are designated as "variable" data. Data field 10 is designated as a residual data field and enables the keyboard 34 so that alphabetic or numeric characters may be entered into the terminal 10 as specialized data. The only restriction on the data entered in data field 10, other than particular control characters to be discussed below, is that the number of characters which may be entered depends on the remaining available memory register 44 character storage positions.

The assembly and storage of data for particular fields is a function of the input control logic section 46 and is, in part, determined by which field identification number is set on the field identification switch 20 (FIG. 4). In particular, the operation of the terminal 10 is such that, if data is to be stored in field 1, the switch 20 position corresponding to field 1 signals the input control logic section 46 to erase everything in the memory register 44 after a first control character, called a field separator which, for the presently preferred embodiment of the invention, is the little-used asterisk (*) character. However, if the switch 20 position for field 4 is set, only the data after the first three fields containing fixed data is erased so that the fixed data remains in the memory register 44. Further, if the switch 20 position for field 7 is set, only the contents of the memory register 44 after the semi-variable data is erased so that the fixed and semi-variable data remains in the register.

Thus, if only the variable data is to be changed from one transmission to the next, the field identification number corresponding to field 7 is moved into position by means of the manual field control knob 24, shown in FIG. 1, and only the variable data is changed and entered into the terminal 10. If both the semi-variable and the variable data is to be changed, the field identification number is moved to field 4 by the knob 24 and only the semi-variable and variable data is changed and entered into the terminal 10.

It should be appreciated that, before data can be stored in a particular field position within the memory register 44, all of the field positions within its group (fixed, semi-variable, or variable) and the following groups in the memory register must be erased. Thus, for example, if the data in the semi-variable field 5 has to be changed, all of fields 4 through 10 must be reentered into the terminal 10 by starting with field 4 which causes the erasure of the data in the semi-variable and variable field positions. A control character indicative of an available storage position is inserted in the erased positions so that they may be detected by the circuitry of the terminal 10. The particular control character utilized in the presently preferred embodiment of the invention is the numeral sign ( # ) character.

Referring to FIGS. 2, 3 and 4, when the field identification switch 20 is in the field 1 position and the store pushbutton 22 is pressed, the output of the memory register 44 is monitored until the first control asterisk is detected which indicates the beginning of the content of the register. At that time, the input control logic section 46 erases the entire contents of the memory register 44 except for the first control asterisk, and inserts numeral signs into all of the available positions.

On the next recirculation of the data in the memory register 44, the input control logic section 46 then detects the asterisk sign and inserts a numeric character corresponding to one of the general input switches 14 into the memory position of the first numeral sign. On the next recirculation of the register 44, the numeric character of the second general input switch is inserted in the second numeral sign position. Thereafter, a numeric character is inserted in each successive numeral sign position on each circulation of the data in the register 44 until numeric characters for all twelve general input switches 14 are stored in the recirculating memory register. In the illustrative embodiment, field 1 contains the telephone number of the computer as discussed above.

The input control logic section 46 then stores a second asterisk following the 12th numeric character to separate the telephone number in field 1 from the remaining memory positions, and the power control section 80 (FIG. 2) is signalled by conventional circuitry (not shown) to turn off the power to all sections of the terminal except the recirculating memory register 44 and the power control section 80.

The field identification switch 20 is then moved to the field 2 position either automatically by the mechanical linkage to the store pushbutton 22, or manually by the knob 24 (FIG. 1), and the general input switches 14 are manipulated to form six alphabetic characters which consist of one alphabetic identification character and one numeric character for a total of 12 characters. Alternate numeric characters serve to designate the alphabetic identification characters and are internally converted, as described below. In the illustrative data terminal 10 of the present invention described herein is used, it is contemplated that the second field would contain a six-letter acronym indicative of the terminal from which the data is being transmitted.

In the illustrative embodiment of the invention, there are three alphabetic identification characters which are tone-code combinations which have no standard numerical significance in the "touch-tone" dialing code, as discussed above. Two of the identification characters have no other significance in the terminal system and are designated $\alpha 1$ and $\alpha 2$. The third alphabetic identification character is the numeral sign ( # ) which takes on identification significance only within those fields, (2 and 10), which may contain alphabetic characters according to the format of the particular illustrative embodiment. The alphabetic characters may be formed of any combination of the identification characters and numbers. The combinations for the illustrative embodiment are shown below in Table I.

TABLE I

| Alphabetic Character | Two Character Equivalent First Character | Second Character |
|---|---|---|
| A | α1 | 1 |
| B | α1 | 2 |
| C | α1 | 3 |
| D | α1 | 4 |
| E | α1 | 5 |
| F | α1 | 6 |
| G | α1 | 7 |
| H | α1 | 8 |
| I | α1 | 9 |
| J | α2 | 1 |
| K | α2 | 2 |
| L | α2 | 3 |
| M | α2 | 4 |
| N | α2 | 5 |
| O | α2 | 6 |
| P | α2 | 7 |
| Q | α2 | 8 |
| R | α2 | 9 |
| Space | # | 1 |
| S | # | 2 |
| T | # | 3 |
| U | # | 4 |
| V | # | 5 |
| W | # | 6 |
| X | # | 7 |
| Y | # | 8 |
| Z | # | 9 |
| , | α1 | 0 |
| - | α2 | 0 |
| $ | # | 0 |

Following the setting of the six alphabetic characters on the general input switches 14, the store pushbutton 22 is depressed, turning on the power control section 80, and a field 2 identification number set on the field identification switch position 20 (field 1 is identified by the first asterisk to save one memory position) and the 12 characters forming the six alphabetic characters are stored in the memory register 44 in the same manner as the field 1 characters. Again, following the storage of the characters set on the general input switches 14, the power to all sections of the terminal 10 except the memory register 44 and the power central section 80 is turned off.

The field identification switch 20 is then set to the field 3 position and twelve numeric characters are set on the general input switches 14. Again, when the store pushbutton 22 is depressed, the power is turned on and the field identification number and the 12 numeric characters are sequentially stored in the memory register 44. Following storage of the twelve numeric characters of field 3, the input control logic section 46 signals the storing of a third asterisk which separates the fixed data from the semi-variable and variable data to be thereafter stored. When the field identification switch is in the field 4 position, the input control logic section 46 is commanded to store the two numeric characters preset on the format code switches 32 before the field identification number and the twelve numeric characters are stored. Thus, the format code data, always associated with field 4, is automatically entered into the terminal 10.

For fields 5 and 6, a field identification number and twelve numeric characters set on the general input switches 14 are stored and the input control logic section 46 is commanded to store a fourth asterisk to separate the semi-variable from the variable data. For field 7, the input control logic section 46 is commanded to first store the two numeric characters which are set on the procedure catalog switches 30 and then store a field identification number and twelve numeric characters, as before. For both fields 8 and 9, a field identification number and twelve numeric characters are stored.

When the field identification switch 20 is set to the field 10 position, any desired residual alphabetic or numeric character may be entered by the keyboard 34 and stored in the memory register 44 up to the limit of the remaining storage positions in the register. In this regard, it should be appreciated that, except for the fields which establish the end of the fixed and semi-fixed data (3 and 6) and the fields which command the erasure of following data (1, 4 and 7), which should ordinarily be kept in sequence, the data contained in the remaining fields (2, 5, 8 and 9), may be deleted entirely in particular applications so that the number of storage positions available for special inputs in field 10 can be considerably greater than the storage positions normally remaining. The computer recognizes which field it is receiving and the maintenance of the particular sequence is only to facilitate entering the data into the terminal 10 or to prevent inadvertent erasure of data.

A more detailed block diagram of the data assembly and transmitting functions of the data terminal 10 of the present invention is shown in FIG. 4. The ten position terminals of the general input, catalog format code, and field identification switches 14, 30, 32 and 20, respectively, are connected together in a common ten-line bus 84 to a four-bit code converter 86 which generates a suitable four-bit code (discussed below) for storage within the terminal in accordance with the activated one of the ten lines of the bus. Which of the switches of the general input, catalog, format code, or field identification switches 14, 30, 32 and 20, respectively, is activated is determined by a series of control lines 88*a*, *b*, *c*, *d*, respectively, from the input control logic section 46 which are selectively enabled in accordance with the field identification switch positions, as discussed above during a common storage sequence provided by conventional timing circuits.

The keyboard 34 operates independently of the switches 14, 30, 32, 20 and generates a six-bit coded word, including the alphabetic identification character, which is outputed from the keyboard on six-lines. Four of the lines 90 are connected in parallel with a four-line output line 92 from the code converter 86 to a second input 94 to the recirculating memory register 44 and the remaining two lines 96 (with the alphabetic identification character) are connected to a third input 98 to the register 44.

Additionally, a plurality of external input devices 100 may also be used to input data to the terminal 10 for special applications and if suitable modifications are made to the terminal 10. It is anticipated that the output from the external input devices 100 will be in four-bit code already so that an output bus 102 from the devices 100 may be connected directly in parallel with the four-line output bus 92 from the code converter 86.

To provide recirculation in the memory register 44, a four-line output bus 104 from the register is fed back to a first input 106 so that four-bit parallel code words are circulated. Additionally, the register output bus 104 is connected to a memory output monitor 108 for detecting the control characters discussed above. Accordingly, a first control line 110 from the memory output monitor 108 is connected to a control input to the input control logic section 46 and a second line 112 from the output monitor is connected to a control input of the output control logic section 56 so that the monitor is associated with both input and output operations.

The proper sequential storage of the data from the general input, catalog, format code, and field identification switches 14, 30, 32, and 20, as well as the keyboard 34, is controlled through the control lines 88*a*, *b*, *c*, *d*, and *e*, respectively, from the input control logic section 46, as as discussed above. The external input devices 100 are enabled by the control line 88f from the input control logic section 46. Which of the first, second and third inputs 106, 94 or 98 to the memory register 44 are enabled is determined by a control line 88g also from the input control logic section 46. Additionally, for field 2, when alphabetic characters are entered into the memory register 44, data on the output bus 92 from the code converter 86 is alternately sent through an alphabetic identification character converter 113 controlled through a line 88h from the input control logic section 46. The four-bit code converter 86 is controlled through the line 88i.

The particular control lines 88a-i which are enabled is determined by a number of control inputs to the input control logic section 46. As discussed above, the store pushbutton 22 is connected to the input control logic section 46 over the line 48 and initiates a particular storage sequence for properly storing data in the memory register 44. The keyboard has the separate control line 49 to the input control logic section 46 and control signals from the memory output monitor 108 are fed to the input control logic section over the line 110, as discussed above. Additionally, the field identification switch 20 has two ganged sections. The first section 118 (FIG. 5) is connected to the bus line 84 to the four-bit code converter 86 and the second section 120 (FIG. 5) is connected over a ten-line bus 114 to the input control logic section 46. Particular combinations of the control inputs determine which of the switches 14, 30, 32, 20, or keyboard 34 are enabled during the storage sequence to input data to the memory register 44. The combination of the control inputs and the timing sequence activate conventional logic circuits of the input control logic section 46 to properly assemble and store the data for all the fields of a complete report in the memory register 44 of the terminal 10 in accordance with the particular illustrative format discussed above.

When the data has been properly assembled in the recirculating memory register 44, the data is ready to be transferred to the computer, as discussed above. In this regard, the call pushbutton 54 may be pressed to automatically dial the computer if the telephone system has the "touch-tone" dialing capability. The call pushbutton 54, therefore, signals the output control logic section 56 to take the telephone number stored in field 1 in the memory register 44 and transfer it to the buffer and tone-code converter 60 over the output bus 104. The converter 60 in turn operates the dual-tone oscillator 66 connected to the telephone line 70 to generate the proper dual audio signals to dial the computer. To this end, the output control logic section 56 is signalled by the memory output monitor 108 over the line 112 when the first data field appears at the output bus 104 of the recirculating memory register 44. The output control logic section 56 then enables the buffer and tone-code converter 60 to receive the output of the memory register 44 and generate the proper tone-code to activate the dual-tone oscillator 66 by means of conventional circuitry. The coded word from the memory register 44 is transferred from the buffer 60 back to the first input 106 of the register over a bus line 116 so that the coded word is not destroyed. The relationship between the four-bit code stored in the memory register 44 and the tone-code for operating the dual-tone oscillator 66 is illustrated in Table II below.

TABLE II

| CHAR | FOUR-BIT MEMORY CODE | TONE-CODE TONE 1 | TONE 2 |
|---|---|---|---|
| 1 | 0 1 0 1 | 0 0 0 1 | 0 0 0 1 |
| 2 | 1 0 0 1 | 0 0 1 0 | 0 0 0 1 |
| 3 | 1 1 0 1 | 0 1 0 0 | 0 0 0 1 |
| Δ1 | 0 0 0 1 | 1 0 0 0 | 0 0 0 1 |
| 4 | 0 1 1 0 | 0 0 0 1 | 0 0 1 0 |
| 5 | 1 0 1 0 | 0 0 1 0 | 0 0 1 0 |
| 6 | 1 1 1 0 | 0 1 0 0 | 0 0 1 0 |
| α2 | 0 0 1 0 | 1 0 0 0 | 0 0 1 0 |
| 7 | 0 1 1 1 | 0 0 0 1 | 0 1 0 0 |
| 8 | 1 0 1 1 | 0 0 1 0 | 0 1 0 0 |
| 9 | 1 1 1 1 | 0 1 0 0 | 0 1 0 0 |
| EOT | 0 0 1 1 | 1 0 0 0 | 0 1 0 0 |
| * | 0 1 0 0 | 0 0 0 1 | 1 0 0 0 |
| 0 | 1 0 0 0 | 0 0 1 0 | 1 0 0 0 |
| # | 1 1 0 0 | 0 1 0 0 | 1 0 0 0 |
| BLANK | 0 0 0 0 | 1 0 0 0 | 1 0 0 0 |

It should be appreciated that the four-bit code in the illustrative code sequence was selected primarily for ease of conversion from the ten-line bus 84 from the switches 14, 32, 30 and 20 and further conversion to the tone-code.

The call pushbutton 54 activates the output control logic section 56 only to dial the computer from the data in field 1 and no further action is taken until the computer indicates that it is ready to receive data by means of a voice message over the telephone line 70 to the audio reproducer 37 shown in FIG. 2. Then, the transmit pushbutton 38 is depressed to activate the output control logic section 56 to transmit data fields 2 through 10 through the buffer 60 and back into the memory register 44, each coded word being converted to the tone-code which then activates the dual-tone oscillator 66 to generate the proper dual audio signals to be transmitted over the telephone line 70 to the computer. The memory output monitor 108 signals the output control logic section 56 when the last character has appeared at the output bus 104 so that the transmission can be stopped.

Figure 5:
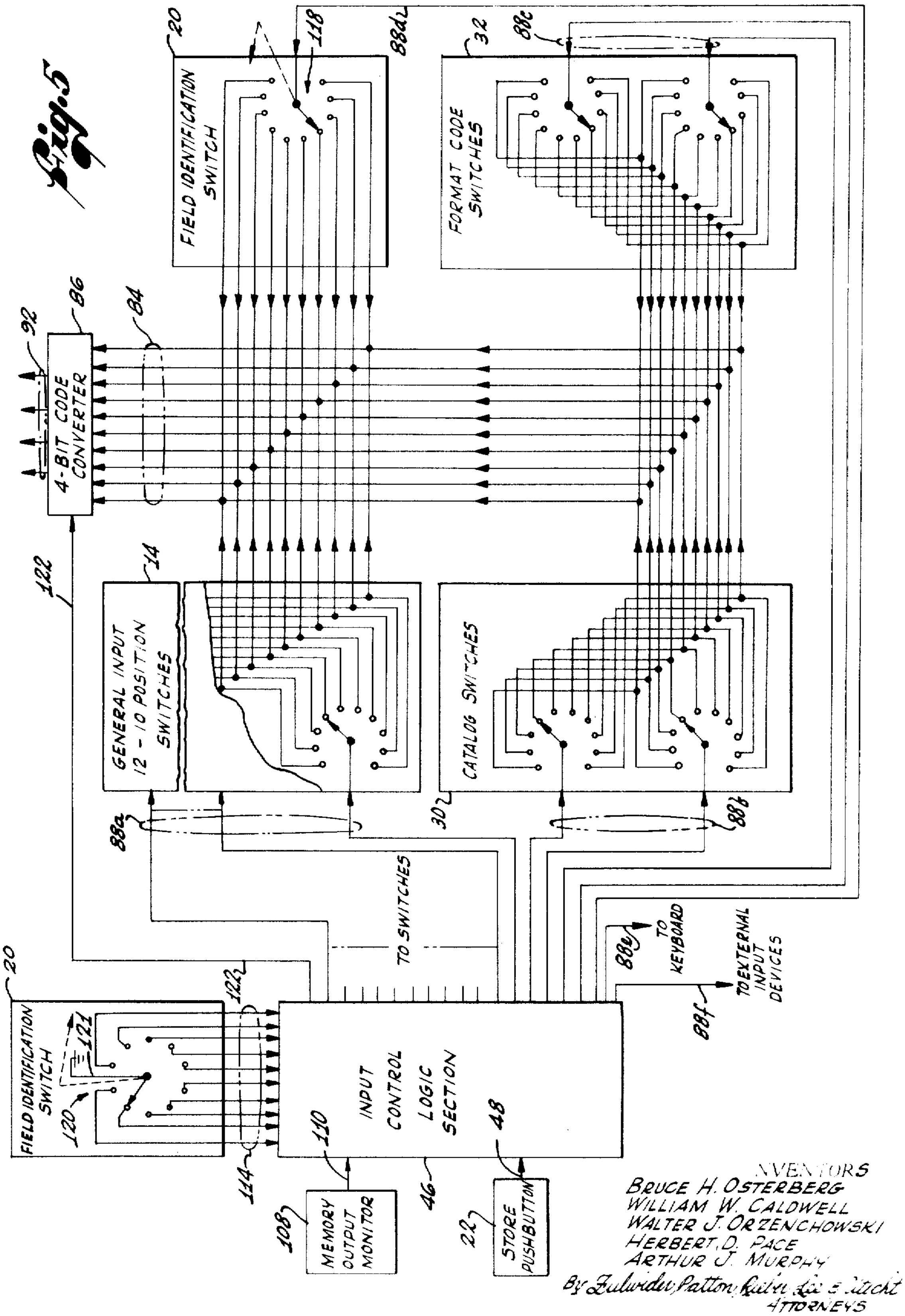
FIG. 5 is a combined block diagram and electrical schematic of the input control logic section and the multiple position switches which form the data input devices for the terminal of the present invention.

FIG. 5 is a detailed combined schematic and block diagram of the switches 14, 30, 32 and 20 used to input data to the terminal 10. In particular, a series of twelve general input switches 14, each having ten positions, are all connected in parallel, with corresponding terminals being connected together. The two ten-position catalog switches 30 and the two format code switches 32 are also connected to the corresponding terminals of all of the general input switches 14. The common connection of the corresponding terminals of the plurality of switches is commonly known as a "wired OR" configuration.

Additionally, as mentioned above, the field identification switch 20 has first and second sections, 118, 120, respectively, ganged together for common rotation, as indicated by the dotted lines to the pole terminals of the switches. The first section 118 of the switch 20 has its ten terminals connected in parallel with the other switches 14, 30, 32 and the second section 120 of the switch 20 has its output terminals connected to the bus line 114 to control inputs of the input control logic section 46 to control the sequential selection of the other switches 14, 30, 32 and 20, as discussed above. The pole terminal of the second section 120 is then connected to a ground reference point 121 so that it is permanently enabled.

All of the commonly connected terminals of the general input, catalog, format code switches 14, 30, 32, respectively, and the first section 118 of the field identification switch 20, are connected through the ten-line bus 84 to the four-bit code converter 86 which generates a four-bit coded word in response to activation of one of the ten lines of the bus. Additionally, an auxilliary input line 122 is connected to the four-bit code converter 86 to generate the control characters at appropriate times during the storage control sequence.

Each of the pole terminals of all of the general input, catalog, format code switches 14, 30, 32, respectively, the keyboard 34, and external input devices 100 are connected to the outputs 88 (*a–f*) of the input control logic section 56 which provides a single sequential enabling signal to the appropriate pole terminal in accordance with the position of the second section 120 of the field identification switch 20, the appropriate output line 110 of the memory output monitor 108, and the store pushbutton 22 connected to the control inputs of the input control logic section. The input control logic section 46 conventionally incorporates a counter to generate a plurality of sequential signals controlled by conventional gate logic to provide enabling control signals for the switches, and external input devices 18, 30, 32, 100, respectively, and the keyboard 34 at any particular time, depending on the field to be entered into the memory register 44.

Thus, the data terminal 10 of the present invention is both manually and automatically controlled to assemble and store data in a recirculating memory register 44 in accordance with a predetermined format. The data to be entered is verified by means of visual observation of the position of a plurality of manually operable switches before storage to eliminate the necessity for a separate and expensive printout device. The computer is then either automatically or manually dialed, depending on the capability of the telephone system and, when the computer indicates that it is ready to receive data by means of a voice message, all of the data in the recirculating memory register 44 can be rapidly and automatically transmitted to the computer.

While a particular preferred embodiment of the invention has been described and illustrated, particularly with reference to a data terminal 10 designed for transmitting medical reports from a physician's office to a central computer, it will be appreciated that the inventive principals employed may be applied to a number of data terminals for allied applications. Therefore, the invention is not to be limited except by the following claims:

We claim:

1. A data terminal system for assemblying a complete message to be later transmitted to a computer, comprising:

storage means for storing data;

input means including a plurality of input single pole-multiple position switches, each input switch having a pole terminal and a switch terminal for each switch position, each switch further having an integral visual numerical readout device for indicating by number the switch position to which the switch is set, corresponding switch terminals of each of said input switches being electrically connected together to form a data line, the data lines for all switch positions forming a multiple line data input bus, said switches being selectively and manually set to particular switch positions to form a data field, said data field being verifiable by observation of said integral visual numerical readout devices;

input control means for entering said data field set on said input switches into said storage means said input control means providing a manually initiated storage control sequence which automatically and sequentially applies enabling signals to the pole terminal of each of said input single pole-multiple position switches, the individually set switch position and associated data line then determining the numerical data entered into said storage means for said switch;

output control means for outputing the data stored in said storage means to said computer said output control means providing a manually initiated automatic output control sequence.

2. The data terminal system defined in claim 1 including data field identification means for generating field identification data to be entered into said storage means with each of the data fields, said field identification means having a field single pole-multiple position switch, said field switch having a pole terminal and a switch terminal for each switch position, said field switch terminals being electrically connected to corresponding switch terminals of said input switches thereby connecting said field switch to said data input bus, said pole terminal of said field switch receiving an enabling signal during said storage control sequence, the set switch position of said field switch thereby entering field identification data into said storage means, said field switch being operatively connected to said input control means for advancement from field switch position to field switch position each time said storage control sequence is manually initiated.

3. The data terminal system defined in claim 2 including a visual data catalog and an indicator manually moveable to point to cataloged data descriptions, said indicator being operatively connected to a pair of catalog single pole-multiple position switches, each combination of particular switch positions of said catalog switches corresponding to a particular cataloged data description.

4. The data terminal system defined in claim 3 including a field description means for providing a visual display of a data description for each data field, said data description being displayed for each data field as said field single pole-multiple position switch is moved from switch position to switch position.

5. The data terminal system defined in claim 4 and further including controlled power supply means connected to said storage means, said input means, and said output control means, said power supply means continuously applying power to said storage means, said power supply means applying power to said input means only when said storage control sequence is manually initiated and said power supply means applying power to said output means only when said automatic output control sequence is manually initiated.

6. A data terminal system, comprising:

storage means for storing data;

a plurality of input single pole-multiple position switches, each input switch having a pole terminal and a switch terminal for each switch position, each switch further having an integral visual numerical readout device for indicating by number the switch position to which the switch is set, said input switches being arrayed to permit manual setting of data in the form of a series of numeric digits on said switches, said input switches having corresponding switch terminals of each of said input switches electrically connected together to form a data line, the data lines for all switch positions forming a multiple line data input bus;

input control means for entering the data set on said input switches into said storage means in a manually initiated automatic storage control sequence which automatically and sequentially applies enabling signals to the pole terminals of said input switches to sequentially enter the numeric digit of the set switch position of each input switch into said storage means;

transmission code converter means for converting the numeric digits stored in said storage means to a transmission code capable of being transmitted over a selected communications line to a central computer; and output control means for sequentially taking data from said storage means and applying said data to said transmission code converter means in an automatic output control sequence, said automatic output control sequence being manually initiated.

7. The data terminal system defined in claim 6 and further including data field identification means for generating field identification data for a plurality of fields of data, said field identification means having a field single pole-multiple position switch, said field switch having a pole terminal and a switch terminal for each switch position, said field switch terminals being electrically connected to corresponding switch terminals of said input switches thereby connecting said field switch to said data input bus, said pole terminal of said field switch receiving an enabling signal during said storage control sequence, the set switch position of said field switch thereby entering field identification data into said storage means, said field switch being operatively connected to said input control means for advancement from field switch positioned to field switch position each time said storage control sequence is manually initiated.

8. The data terminal system defined in claim 7 and further including data field description means for carrying visual descriptions of said data fields, said field description means being operatively connected to said field switch to visually display a description of the data to be entered into the input switches for each of the switch positions of said field switch.

9. The data terminal system defined in claim 7 and further including a visible catalog display of predetermined data descriptions having a pair of catalog switches which generate a predetermined coded switch output in accordance with the physical alignment of a manually operated indicator connected to said catalog switches with the selected displayed data description, each of said catalog switches having a pole terminal and a switch terminal for each switch position, said catalog switch terminals being electrically connected to corresponding input switch terminals of said input switches thereby connecting said catalog switch to said data input bus, said pole terminal of said catalog switch receiving an enabling signal during said storage control sequence, the set combinations of said catalog switch positions thereby entering cataloged data descriptions into said storage means.

10. The data terminal system of claim 9 wherein:

said storage means includes memory code conversion means for converting the numeric digit signals on particular data lines of said multiple line data input bus to a four-bit binary character representing said numeric digit for storage in said storage means; and said input control means generates said enabling signals for selectively enabling each of said input, catalog, and field identification switches in a control sequence which is predetermined and controlled by the position of said field identification switch, said enabling signals being sequentially applied to the pole terminals of said switches whereby a particular numeric digit signal on a data line associated with a set switch position is converted into said corresponding four-bit binary character through said memory code convertion means.

11. The data terminal system in claim 10 and further including controlled power supply means for continuously supplying power to said storage means, said power supply means applying power to said input control means only when said storage control sequence is manually initiated and said power supply means supplying power to said code converter means and said output control means only when said output control sequence is manually initiated.

12. The data terminal system of claim 10 wherein said transmission code is a two out of eight audio tone-code and said transmission code converter means converts said four-bit binary character to said tone-code.

13. The data terminal system defined in claim 12 wherein alphabetic characters may be represented in said storage means for particular data fields, said alphabetic characters being represented by a combination of an alphabetic identification character and a numeric character; and said memory code conversion means includes an alphabetic identification character converter means for converting numeric digits set on particular ones of said input switches to said alphabetic identification character under the control of said input control means for said particular data fields.

14. The method of assemblying data in a data terminal for transmission to a central computer, comprising the steps of:

separating said data into data fields of predetermined length;

manually setting said data fields, one data field at a time, on a plurality of physically alined data input devices by manipulating said data input devices to correspond with the alignment of items in said data field, said data input devices having integral visual displays of the data set on said input devices to permit verification of said set data field by observing said displays;

manually initiating the automatic sequential entering of the entire data field set on said input devices into a memory means;

manually initiating a connection by communication lines with the central computer;

determining by voice message response from the computer that the computer is ready to receive data;

and manually initiating the automatic sequential transmission of the data stored in said memory means to the central computer.

15. The method defined in claim 14 including the step of setting data on said input devices in accordance with a visual field description on a field description means; and automatically incrementing said field description means for each manual initiation of said entry of data into said memory means.

16. The method defined in claim 15 including the step of continuously applying power to said memory means and selectively applying power to said data entering, connection initiation, and transmission means when said data entry, computer connection and data transmission means are initiated.

* * * * *